(12) United States Patent
An et al.

(10) Patent No.: US 11,444,349 B2
(45) Date of Patent: Sep. 13, 2022

(54) BATTERY

(71) Applicant: Ningde Amperex Technology Limited, Fujian (CN)

(72) Inventors: Jiaxin An, Fujian (CN); Jinhua He, Fujian (CN); Wei Gao, Fujian (CN); Jinhui Chen, Fujian (CN); Kun Wang, Fujian (CN)

(73) Assignee: Ningde Amperex Technology Limited

( * ) Notice: Subject to any disclaimer, the term of this patent is extended or adjusted under 35 U.S.C. 154(b) by 281 days.

(21) Appl. No.: 16/168,826

(22) Filed: Oct. 24, 2018

(65) Prior Publication Data
US 2019/0229304 A1 Jul. 25, 2019

(30) Foreign Application Priority Data

Jan. 25, 2018 (CN) .......................... 201820129871.7

(51) Int. Cl.
*H01M 50/116* (2021.01)
*H01M 50/20* (2021.01)
*H01M 50/24* (2021.01)
*H01M 10/04* (2006.01)
(Continued)

(52) U.S. Cl.
CPC ......... *H01M 50/116* (2021.01); *H01M 10/04* (2013.01); *H01M 50/103* (2021.01);
(Continued)

(58) Field of Classification Search
CPC ............. H01M 2/0275; H01M 2/1077; H01M 2/0212; H01M 2/266; H01M 2/1094;
(Continued)

(56) References Cited

U.S. PATENT DOCUMENTS 6,709,789 B1 * 3/2004 Hambitzer ........ H01M 10/4235
429/321
8,728,640 B2 * 5/2014 Byun .................. H01M 10/425
429/7

(Continued)

FOREIGN PATENT DOCUMENTS

CN 101533926 9/2009
CN 102074724 5/2011
(Continued)

OTHER PUBLICATIONS

AAPA (Applicant Admitted Prior Art; taken from paragraph [0025] and figure 1 of the instant published application) (Year: 2016).*
(Continued)

*Primary Examiner* — Christian Roldan
(74) *Attorney, Agent, or Firm* — Taylor English Duma LLP

(57) ABSTRACT

The present application discloses a battery to alleviate the impact on the main body of the battery and for improving the safety performance of the battery. The battery comprises a package case and a circuit board, wherein the package case forms a first surface and a buffer member is arranged between the circuit board and the first surface. In the present application, the buffer member between the circuit board and the first surface may alleviate the force received on the first surface, thereby alleviating the impact on the electrode assembly of the battery, avoiding the damage of the positive and negative electrode plates and the short circuit caused by the contact between the positive and negative electrodes, and improving the safety of battery.

7 Claims, 4 Drawing Sheets

(51) Int. Cl.
*H01M 50/54* (2021.01)
*H01M 50/103* (2021.01)
*H01M 50/557* (2021.01)

(52) U.S. Cl.
CPC ........... *H01M 50/20* (2021.01); *H01M 50/24* (2021.01); *H01M 50/54* (2021.01); *H01M 50/557* (2021.01); *H01M 2200/00* (2013.01)

(58) Field of Classification Search
CPC .............. H01M 10/04; H01M 2/0217; H01M 2200/00; H01M 2220/00; H01M 2/347
USPC ......................................................... 429/163
See application file for complete search history.

(56) References Cited

U.S. PATENT DOCUMENTS

| | | | |
|---|---|---|---|
| 2009/0155681 A1* | 6/2009 | Lin ..................... | H01M 50/209 429/163 |
| 2009/0191456 A1* | 7/2009 | Yamamoto .......... | H01M 50/124 429/163 |
| 2012/0052333 A1* | 3/2012 | Baek ................... | H01M 2/0404 429/7 |
| 2017/0098868 A1* | 4/2017 | Kotik ........................ | B32B 7/05 |
| 2018/0083305 A1* | 3/2018 | Kim .................. | H01M 10/0468 |

FOREIGN PATENT DOCUMENTS

| | | |
|---|---|---|
| CN | 103718342 | 4/2014 |
| CN | 204407435 | 6/2015 |
| CN | 206194899 | 5/2017 |
| CN | 206878060 | 1/2018 |

OTHER PUBLICATIONS

An, Jiaxin; Office Action for Chinese Patent Application No. 201820129871.7, filed Jan. 25, 2018, dated Jul. 5, 2018, 2 pgs.

* cited by examiner

BATTERY

CROSS-REFERENCE TO RELATED APPLICATIONS

The present application claims priority to Chinese Patent Application No. 201820129871.7, filed on Jan. 25, 2018, the content of which is incorporated herein by reference in its entirety.

FIELD OF THE INVENTION

The present application relates to the field of battery, in particular, to a battery.

BACKGROUND OF THE INVENTION

At present, more and more electronic devices use soft pouch batteries as their power source. With the increase in battery requirements for electrical equipment, the battery develops to be with high specific energy and high magnification, so the safety requirements for the battery are also increasing. When the battery is required to be charged and discharged, the tabs are required to transmit current. For the soft pouch battery, the electrode assembly is usually sealed and packaged by the package case. The key to the good sealing performance is to make the tab and the package shell be packed well. The battery may be impacted in the process of being manufactured or used, which may cause the top seal of the battery to be damaged and opened, thereby causing the battery to burn or explode leading a safety hazard.

SUMMARY OF THE INVENTION

The purpose of the present application is to provide a battery to alleviate the impact on the main body of the battery for improving the safety performance of the battery.

The present application provides a battery comprising a package case and a circuit board, wherein the package case forms a first surface, and a buffer member is arranged between the circuit board and the first surface.

Specifically, the battery further comprises an electrode assembly including an electrode tab; the package case further includes a first side; the electrode tab extends from the first side and is coupled to the circuit board.

Optionally, the buffer member includes an elastic layer.

Optionally, the buffer member includes at least two elastic layers and a rigid layer arranged between the at least two elastic layers.

Optionally, the buffer member includes a first buffer portion between the circuit board and the first surface and a second buffer portion between the circuit board and the first side.

Optionally, the first buffer portion and the second buffer portion are integrally formed.

Optionally, the first buffer portion includes at least two elastic layers and a rigid layer arranged between the at least two elastic layers; the second buffer member includes an elastic layer.

Optionally, the material of the elastic layer is at least one selected from the group consisting of polyvinylidene fluoride, polyethylene, polypropylene, styrene butadiene rubber, silica gel and rubber.

Optionally, the thickness of the buffer member is between 0.1 mm and 5 mm.

Optionally, the electrode assembly is adhered to an inner wall of the package case.

In the battery provided by the embodiment of the present application, a buffer member is arranged between the circuit board and the first surface. When an impact or vibration occurs, on the one hand, the circuit board impacts on the main body, and directly hits the buffer member instead of the first surface of the battery, so that the first side may be protected from being easily opened and the damage of the package case is decreased; on the other hand, the buffer member may disperse the stress generated when the circuit board hits the package case to weaken the force received on the first surface, thereby alleviating the impact on the electrode assembly, avoiding damage to the positive and negative electrode plates and short-circuiting between the positive and negative electrodes. Therefore, the solution of the present application may alleviate the impact force of the circuit board on the first surface, and reduce the probability and degree of damage on the first side, thereby improving the safety performance of the battery.

Figure 1:
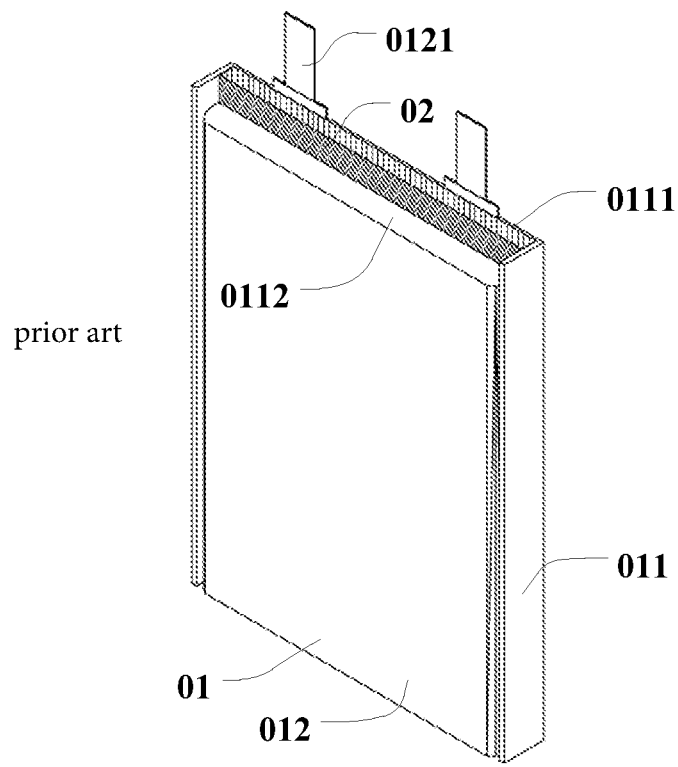
FIG. 1 illustrates a structural view of a battery in the prior art.

| Reference numerals: | |
|---|---|
| For the prior art: | |
| 01-main body; | 011-package case; |
| 0111-first side; | 0112-first surface; |
| 012-electrode assembly; | 0121-electrode tab; |
| 02-circuit board; | |
| For the present application: | |
| 1-main body; | 11-package case; |
| 111-first surface; | 112-first side; |
| 12-electrode assembly; | 121-electrode tab; |
| 2-circuit board; | 21-the side of the circuit board away from the first surface; |
| 3-buffer member; | 31-first buffer portion; |
| 32-second buffer portion; | 33-third buffer portion. |

DETAILED DESCRIPTION OF THE PREFERRED EMBODIMENTS

In order to alleviate the impact on the main body of the battery, thereby improving the safety performance of the battery, the present application provides a battery. To make the objects, technical solutions and advantages of the present application more clear, the following embodiments will be exemplified to further describe the present application in detail.

With reference to FIG. 1, a battery in the prior art comprises a main body 01 and a circuit board 02, wherein the main body 01 includes a package case 011 and an electrode assembly 012 packaged in the package case 011; the electrode assembly 012 further includes an electrode tab 0121 and the package case 011 forms a first side 0111 at a position close to the electrode tab 0121; the first side 0111 is a sealing edge formed by sealing two layers of packaging films, and the electrode tab 0121 protrudes from the first side 0111. The main body 01 forms a first surface 0112 at a position connected to the first side 0111, and the circuit board 02 is fixed to the first surface 0112 of the main body 01. When the battery is dropped or impacted, the circuit board 02 easily hits the first surface 0112 of the main body 01, so that the position of the first side 0111 of the main body 01 is easily damaged and opened, then problems such as burning or explosion of the battery may be caused to pose a safety hazard.

Figure 2:
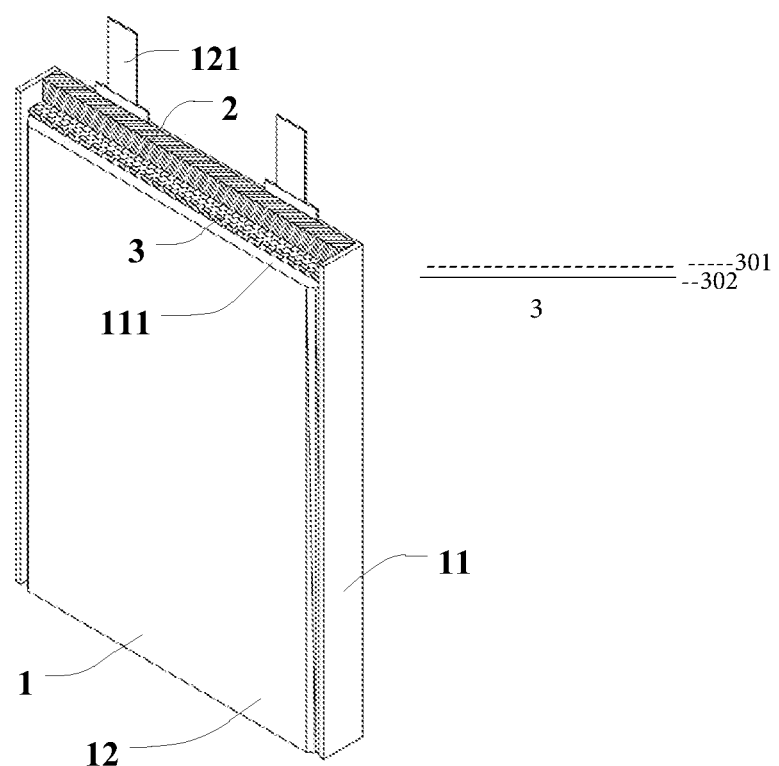
FIG. 2 illustrates a structural view of the battery in accordance with the first embodiment of the present application.
Figure 3:
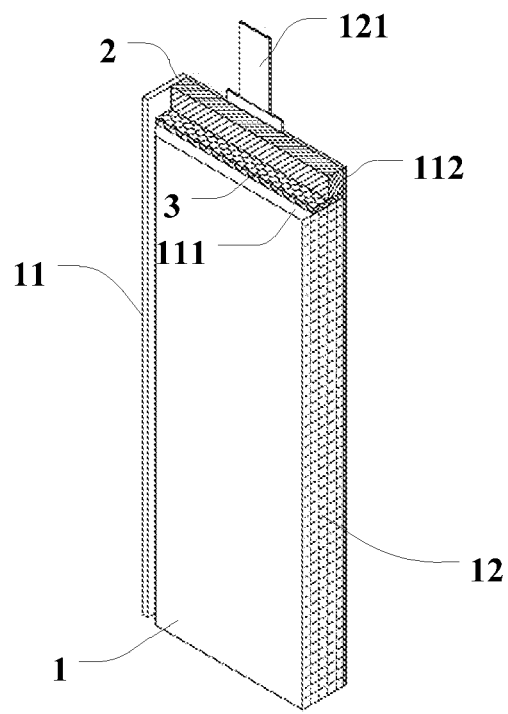
FIG. 3 illustrates a section structural view taken from the battery in FIG. 2.

In order to solve the safety problem of the battery in the prior art, embodiments of the present application provide a battery. With reference to FIGS. 2 and 3, the battery comprises a main body 1 and a circuit board 2, wherein the main body 1 includes a package case 11, and the package case 11 forms a first surface 111 and a first side 112; the first surface 111 is adjacent to the first side 112, and a buffer member 3 is arranged between the circuit board 2 and the first surface 111.

In the battery provided by the present application, a buffer member 3 is arranged between the circuit board 2 and the first surface 111. When an impact or vibration occurs, on the one hand, the circuit board 2 impacts on the package case 11, and directly hits the buffer member 3 instead of the first surface 111 of the battery, so that the first side 112 may be protected from being easily opened and the damage of the package case 11 is weakened; on the other hand, the buffer member 3 may disperse the stress generated when the circuit board 2 hits the package case 11 to weaken the force received on the first surface 111, thereby alleviating the impact on the electrode assembly 12, avoiding damage to the positive and negative electrode plates and short-circuiting between the positive and negative electrodes. Therefore, the solution may alleviate the impact force of the circuit board 2 on the first surface 111, and reduce the probability and degree of damage on the first side 112, thereby improving the safety performance of the battery.

It should be noted that referring to FIG. 3, in an embodiment of the present application, the main body 1 includes the package case 11 and the electrode assembly 12 packaged in the package case 11, and the package case 11 is required to package the electrode assembly 12 in a sealing manner. Thus, the package case 11 includes the first side 112 formed by sealing. Specifically, the first side 112 is formed by packaging two layers of package films of the package case 11. The package case 11 is generally a cubic structure, and forms the first surface 111 at an area adjacent to the first side 112. However, in the present application, the circuit board 2 is arranged between the first surface 111 and the first side 112 of the package case 11.

With continuous reference to FIG. 3, the electrode assembly 12 further includes an electrode tab 121, and specifically, the electrode tab 121 protrudes from above the first side 112. The first side 112 and the first surface 111 may form a mounting space of the circuit board 2 to facilitate to mount the circuit board 2.

In an alternative embodiment, the material of the buffer member is not limited, and may be a buffer member made of a single material, or a buffer member formed by laminating a plurality of materials. Optionally, the buffer member includes an elastic layer (FIG. 2, 301) to improve the buffer performance of the buffer member. When the circuit board hits the electrode assembly, the elastic layer may act as a buffer effect to reduce the impact force received by the first side 112 of the package case 11. Specifically, the elastic layer may be a rubber layer, a silicone layer, or another elastic layer having an elastic material.

In an alternative embodiment, the buffer member includes two elastic layers and a rigid layer, and the rigid layer is arranged between the two elastic layers. The buffer member in this embodiment includes both the rigid layer and the elastic layer (FIGS. 2, 302 and 301, respectively). When subjected to impact, the elastic layer may act as a buffer effect, and also the effects of dispersing stress from the rigid layer is better, so the first side may be better protected. In this embodiment, the surface of the buffer member that is in contact with the first surface and the circuit board is the elastic buffer member 3, and the buffering effect thereof is better.

Specifically, the material of the rigid layer is not limited, and may be a rigid layer of a metal such as a steel rigid layer, an aluminum rigid layer, a copper rigid layer or a hard alloy spacer, or a rigid layer of a polymer composite material such as polytetrafluoroethylene, polyvinyl chloride, polystyrene, polycarbonate, epoxy resin, polyamide, polyimide, and the like.

Figure 4:
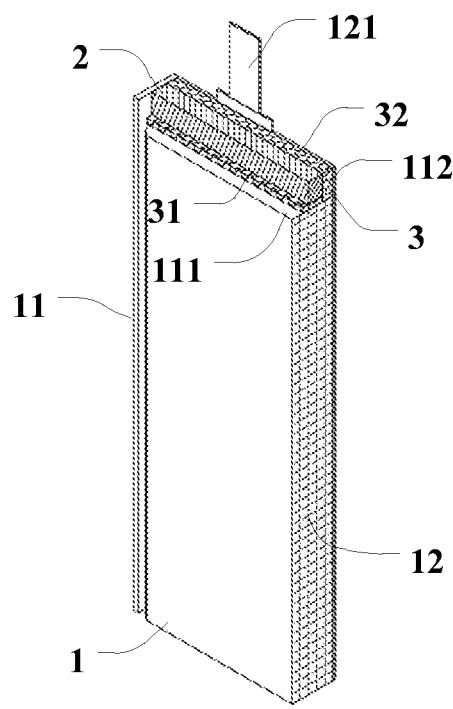
FIG. 4 illustrates a section structural view of the battery in accordance with the second embodiment of the present application.

With reference to FIG. 4, in the embodiment, the buffer member 3 includes a first buffer portion 31 between the circuit board 2 and the first surface 111, and a second buffer portion 32 between the circuit board 2 and the first side 112.

In the embodiment, the buffer member 3 is arranged at a contact position between the circuit board 2 and the package case 11 to isolate the circuit board 2 from the package case 11, so the circuit board 2 does not directly hit the package case 11 when a collision caused by an external force appears. The buffer member has a buffering effect for the external force, so that the force acting on the main body is reduced, thereby preventing the first side 112 from opening, further reducing the probability and degree of damage of the first side 112, and thus improving the safety performance of the battery.

With continuous reference to FIG. 4, in a specific embodiment, the first buffer portion 31 and the second buffer portion 32 are integrally formed. In the embodiment, the first buffer portion 31 and the second buffer portion 32 are integrally formed to facilitate both the manufacturing and the installation. More importantly, the integrity of the buffer member 3 may be improved, so that the effect in dispersing stress from the buffer member 3 may be improved, and the effect in protecting the first side 112 from the buffer member 3 may be improved.

Figure 5:
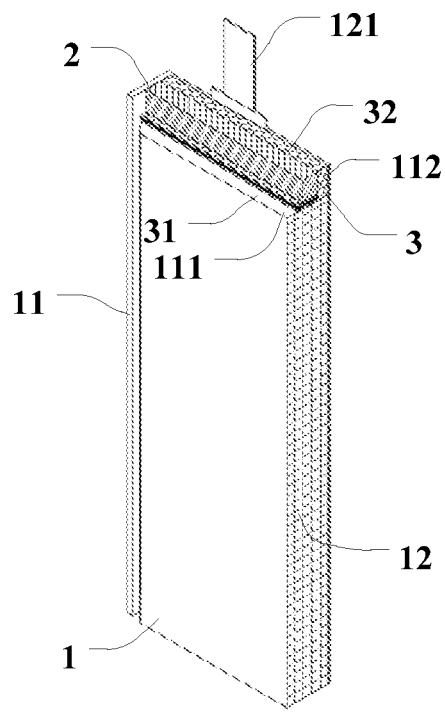
FIG. 5 illustrates a section structural view of the battery in accordance with the third embodiment of the present application.

With reference to FIG. 5, in another specific embodiment, the first buffer portion 31 includes two elastic layers and a rigid layer, the rigid layer being arranged between the two elastic layers; the second buffer portion 32 includes the elastic layer. The first buffer portion 31 includes the rigid layer.

In another embodiment, the first buffer portion is fixedly connected to the second buffer portion, and the specific connection manner is not limited, and for example, they may be bonded or pressed with each other. The integrity of the buffer member may be improved to facilitate installation and be more favorable for dispersing stress for improving the effect in protecting the first sealing portion from the buffer member. Of course, the first buffer portion and the second buffer portion may also be two independent structures.

Figure 6:
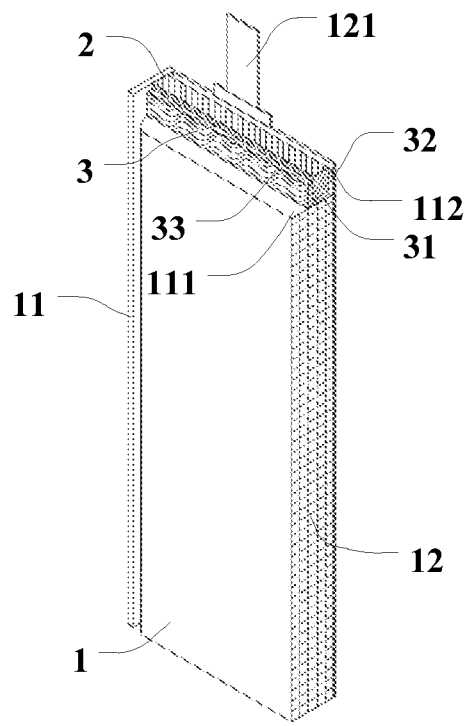
FIG. 6 illustrates a section structural view of the battery in accordance with the fourth embodiment of the present application.

With reference to FIG. 6, in an alternative embodiment, the buffer member 3 includes the first buffer portion 31 between the circuit board 2 and the first surface 111, and the second buffer portion 32 between the circuit board 2 and the first side 112, and further includes a third buffer portion 33 on a side of the circuit board 2 opposite to the first side 112. In the embodiment, in addition to the side 21 of the circuit board away from the first surface, the other sides are provided with the buffer portions to isolate the circuit board 2 from the package case 11, thereby further reducing the damage of the circuit board 2 to the first side 112 of the package case 11, and thus improving the safety performance of the battery.

Figure 7:
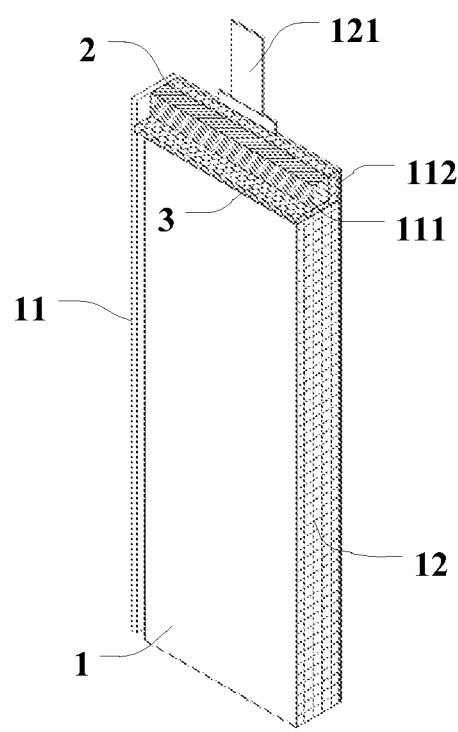
FIG. 7 illustrates a section structural view of the battery in accordance with the fifth embodiment of the present application.

With reference to FIG. 7, the buffer member 3 is equal in area to the first surface 111. The buffer member 3 between the circuit board 2 and the first surface 111 completely covers the end of the package case 11. In the embodiment, the area of the buffer member 3 between the circuit board 2 and the first surface 111 is larger. So the buffer member 3 may also function to protect the package case 11 and further improve the effect of protecting the first side 112 given that the position of the circuit board 2 relative to the first surface 111 is changed during the impact caused by the external force.

In an alternative embodiment, the thickness of the buffer member is between 0.1 mm and 5 mm. The larger the thickness of the buffer member, the better the buffering effect is, but when the buffer member is too thick, the energy density of the battery may be reduced. Therefore, after analysis and calculation, the thickness of the buffer member should be no more than 5 mm. The specific thickness of the buffer member has a certain relationship with its own material. Thus, in practical applications, the buffer member with a smaller thickness should be selected to enhance the energy density of the battery under the condition that the first side may be protected from damage and the battery has a high safety performance.

In a more preferred embodiment, the electrode assembly 12 is adhered to the inner wall of the package case 11. Generally, there is a gap between the electrode assembly 12 and the inner wall of the package case 11 so that the electrode assembly 12 has sufficient space for thermal expansion. When the battery is dropped or encounters a collision, since the electrode assembly 12 is adhered to the inner wall of the package case 11, the impact between the electrode assembly 12 and the package case 11 may be reduced so as to further protect the first side 112.

The inventor of the present application selects the battery of the prior art as shown in FIG. 1 and the batteries in the embodiments of the present application shown in FIG. 4, FIG. 5 and FIG. 6, and names the above batteries as a comparison group, test group 1, test group 2 and test group 3 respectively, to perform a roller test and a drop test for comparing the damage of batteries of various structures. The pass rate of the tests for various batteries is shown in Table 1. It is worth noting that passing the tests means that the first side of the battery has no damages or open defects.

Table 1 shows the test record of the pass rate of the tests for various batteries

| test name | comparison group | test group 1 | test group 2 | test group 3 |
|---|---|---|---|---|
| roller test | 50% | 90% | 80% | 90% |
| drop test | 30% | 100% | 90% | 90% |

The steps of the above roller test include: 1. the electrode assembly is fully charged according to standard methods, and the internal resistance and voltage of the electrode assembly are recorded; 2. the electrode assembly is placed in the fixture (the fixture specifications are as required by the project) and the test box at a height of 1 m is flipped, wherein the test box is set to rotate 12 laps per minute, 50 laps is rotated per cycle with a total of 100 cycles, and the appearance and function of one side are checked every 10 cycles; 3. After the test is completed, the battery is left at room temperature for 24 hours, and then the first side of the battery is detected for damages or open defects.

The steps of the above drop test include: 1. the electrode assembly is fully charged according to standard methods, and the internal resistance and voltage of the electrode assembly are recorded; 2. the electrode assembly is placed in the fixture (the fixture specifications are as required by the project) and is dropped from a height of 1 m, wherein the 6 faces and 4 corners of the fixture are dropped once as 1 cycle for a total of 5 cycles; 3. after the test is completed, the battery is left at room temperature for 24 hours, and then the first side of the battery is detected for damages or open defects.

As can be seen from the test results recorded in Table 1, compared with the prior art, the probability of damage to the first side of the battery of each solution in the embodiments of the present application is significantly reduced, and the performance is obviously improved, so the present application may alleviate the impact received by the main body of the battery and improve the safety performance of the battery.

It will be apparent to those skilled in the art that various modifications and variations of the present application can be made without departing from the spirit or scope of the present application. If these various modifications and variations of the present application belong to the scope of the claims and equivalent technical scope of the present application, the present application is also intended to comprise these modifications and variations.

What is claimed is:

1. A comprising a package case and a circuit board, wherein the package case forms a first surface parallel to the circuit board, and a buffer member is arranged between the circuit board and the first surface, the buffer member being parallel to the first surface and parallel to the circuit board, wherein the buffer member comprises a layered structure comprising at least an elastic layer and a rigid layer,
   wherein the battery further comprises an electrode assembly including an electrode tab; the package case further includes a first side perpendicular to the first surface; and the electrode tab extends from the first side and is coupled with the circuit board,
   wherein the buffer member includes a first buffer portion arranged between the circuit board and the first surface and a second buffer portion arranged between the circuit board and the first side, and
   wherein the first buffer portion includes at least two elastic layers with the rigid layer arranged between the at least two elastic layers.

2. The battery according to claim 1, wherein the first buffer portion and the second buffer portion are integrally formed.

3. The battery according to claim 1, wherein a material of the elastic layer is at least one selected from the group consisting of polyvinylidene fluoride, polyethylene, polypropylene, styrene butadiene rubber, silica gel and rubber.

4. The battery according to claim 2, wherein the thickness of the buffer member is between 0.1 mm and 5 mm.

5. The battery according to claim 1, wherein the thickness of the buffer member is between 0.1 mm and 5 mm.

6. The battery according to claim 3, wherein the thickness of the buffer member is between 0.1 mm and 5 mm.

7. The battery according to claim 1, wherein the electrode assembly is adhered to an inner wall of the package case.

\* \* \* \* \*

UNITED STATES PATENT AND TRADEMARK OFFICE
CERTIFICATE OF CORRECTION

PATENT NO. : 11,444,349 B2
APPLICATION NO. : 16/168826
DATED : September 13, 2022
INVENTOR(S) : Jiaxin An et al.

Page 1 of 1

It is certified that error appears in the above-identified patent and that said Letters Patent is hereby corrected as shown below:

In the Claims

Column 6, Line 42, "A comprising a package case and a circuit board" should read --A battery, comprising a package case and a circuit board--.

Signed and Sealed this
Seventh Day of May, 2024

Katherine Kelly Vidal
*Director of the United States Patent and Trademark Office*